United States Patent
Brandow et al.

(10) Patent No.: US 8,434,097 B2
(45) Date of Patent: Apr. 30, 2013

(54) DYNAMIC DATA BINDING FOR MBOS FOR CONTAINER BASED APPLICATION

(75) Inventors: David Brandow, Guelph (CA); Johannes Alberti, San Ramon, CA (US); Himagiri Mukkamala, Pleasanton, CA (US)

(73) Assignee: Sybase, Inc., Dublin, CA (US)

( * ) Notice: Subject to any disclaimer, the term of this patent is extended or adjusted under 35 U.S.C. 154(b) by 597 days.

(21) Appl. No.: 12/650,464

(22) Filed: Dec. 30, 2009

(65) Prior Publication Data
US 2011/0161983 A1    Jun. 30, 2011

(51) Int. Cl.
*G06F 13/00* (2006.01)
(52) U.S. Cl.
USPC .......................................... 719/316; 719/332
(58) Field of Classification Search ................... 719/316, 719/332
See application file for complete search history.

(56) References Cited

U.S. PATENT DOCUMENTS

| | | | |
|---|---|---|---|
| 6,381,241 B1 | 4/2002 | Ghirnikar et al. | |
| 6,457,062 B1 | 9/2002 | Pivowar et al. | |
| 6,553,037 B1 | 4/2003 | Pivowar et al. | |
| 6,983,293 B2 | 1/2006 | Wang | |
| 7,359,920 B1 | 4/2008 | Rybicki et al. | |
| 7,428,418 B2 * | 9/2008 | Cole et al. | 455/456.1 |
| 7,565,381 B2 | 7/2009 | Oswalt | |
| 7,613,834 B1 | 11/2009 | Pallipuram et al. | |
| 7,620,001 B2 | 11/2009 | Ganji | |
| 7,672,853 B2 | 3/2010 | Gune et al. | |
| 7,752,165 B2 | 7/2010 | Ireland et al. | |
| 7,792,790 B2 | 9/2010 | Kim | |
| 8,019,863 B2 | 9/2011 | Jeide et al. | |
| 8,023,934 B2 | 9/2011 | Jeide et al. | |
| 2003/0005161 A1 | 1/2003 | Chen et al. | |
| 2004/0205770 A1 | 10/2004 | Zhang et al. | |
| 2004/0266441 A1 | 12/2004 | Sinha et al. | |
| 2005/0021354 A1 | 1/2005 | Brendle et al. | |
| 2005/0055465 A1 | 3/2005 | Sato | |
| 2005/0055698 A1 | 3/2005 | Sasaki et al. | |
| 2005/0085503 A1 | 4/2005 | Tsukamoto et al. | |
| 2005/0091156 A1 | 4/2005 | Hailwood et al. | |

(Continued)

FOREIGN PATENT DOCUMENTS

| | | | |
|---|---|---|---|
| KR | 10-2003-0072693 A | 9/2003 |
| KR | 10-2006-0060629 A | 6/2006 |
| KR | 10-2011-0074059 A | 6/2011 |

OTHER PUBLICATIONS

Jeide et al., U.S. Appl. No. 13/227,600, filed Sep. 8, 2011, entitled "Synchronizing Events Between Mobile Devices and Servers".

(Continued)

*Primary Examiner* — Andy Ho
(74) *Attorney, Agent, or Firm* — Sterne, Kessler, Goldstein & Fox PLLC

(57) ABSTRACT

Systems, methods and computer program products for dynamically binding data from a remote data source in a container-based mobile application are described herein. The method includes the steps of: 1) defining a metadata source that references both a mobile business object (MBO) and the mobile application, the MBO being connected to the remote data store; 2) binding an attribute from the MBO to the mobile application using the metadata source; and 3) changing, dynamically, the binding of the attribute while the mobile application is executing.

13 Claims, 11 Drawing Sheets

U.S. PATENT DOCUMENTS

| | | | |
|---|---|---|---|
| 2005/0227614 | A1 | 10/2005 | Hosking et al. |
| 2005/0268032 | A1 | 12/2005 | Sikdar et al. |
| 2006/0112398 | A1 | 5/2006 | Mukkamala et al. |
| 2006/0123010 | A1 | 6/2006 | Landry et al. |
| 2006/0174016 | A1 | 8/2006 | Critchley et al. |
| 2006/0245530 | A1 | 11/2006 | Pradhan et al. |
| 2007/0099640 | A1 | 5/2007 | Khushu et al. |
| 2007/0100834 | A1 | 5/2007 | Landry et al. |
| 2007/0226233 | A1* | 9/2007 | Walter et al. ............... 707/100 |
| 2007/0260475 | A1 | 11/2007 | Bhanote |
| 2008/0027931 | A1 | 1/2008 | Lu et al. |
| 2008/0155525 | A1 | 6/2008 | Ho |
| 2008/0176536 | A1 | 7/2008 | Galluzzo et al. |
| 2009/0037430 | A1 | 2/2009 | Mukkamala et al. |
| 2009/0177800 | A1 | 7/2009 | Gidron et al. |
| 2009/0187622 | A1 | 7/2009 | Xie |
| 2009/0198772 | A1 | 8/2009 | Kim et al. |
| 2009/0199112 | A1* | 8/2009 | DeSerranno ............... 715/760 |
| 2009/0222402 | A1 | 9/2009 | Tysowski |
| 2009/0247134 | A1 | 10/2009 | Jeide et al. |
| 2009/0282125 | A1 | 11/2009 | Jeide et al. |
| 2009/0282349 | A1* | 11/2009 | Olsen et al. ............... 715/760 |
| 2010/0030783 | A1 | 2/2010 | Ho et al. |
| 2011/0161339 | A1 | 6/2011 | Ireland et al. |
| 2011/0161349 | A1 | 6/2011 | Ireland et al. |
| 2011/0161383 | A1 | 6/2011 | Ho et al. |

OTHER PUBLICATIONS

Linthicum, David S., "Chapter 20, EAI Moving Forward," In Enterprise Application Integration, Addison-Wesley, XP000002659187, ISBN: 0-201-61583-5, pp. 339-349.

Linthicum, David S., "Chapter 11: Database-Oriented Middleware and EAI", In Enterprise Application Integration, Addison-Wesley, XP002579155, ISBN: 978-0-201-61583-8, May 1, 2000.

Sinitsyn, A. "A Synchronization Framework for Personal Mobile Servers," In: Proceedings of IEEE on Passive Computing and Communications Workshops, 2nd Annual Conference, 2004, See abstract, p. 4.

Office Communication, dated Sep. 19, 2011, for U.S. Appl. No. 12/503,573, filed Jul. 15, 2009, 12 pages.

Notification of Transmittal of the International Search Report and Written Opinion, dated Mar. 18, 2010, for PCT Appl. No. PCT/US2009/004343, 11 pages.

Notification of Transmittal of the International Search Report and Written Opinion, dated Aug. 2, 2011, for PCT Appl. No. PCT/US2010/060293, 11 pages.

Notification of Transmittal of the International Search Report and Written Opinion, dated Jul. 28, 2011, for PCT Appl. No. PCT/US2010/060290, 10 pages.

Notification of Transmittal of the International Search Report and Written Opinion, dated Aug. 5, 2011, for PCT Appl. No. PCT/US2010/060296, 9 pages.

Notification of Transmittal of the International Search Report and Written Opinion, dated Aug. 30, 2011, for PCT Appl. No. PCT/US2010/061547, 9 pages.

Extended European Search Report, dated Sep. 27, 2011, for European Patent Appl. No. 09803252.7, 7 pages.

English Abstract for Korean Patent Pub. No. 10-2003-0072693 A, published Sep. 19, 2003, 1 page, from http://worldwide.espacenet.com.

English Abstract for Korean Patent Pub. No. 10-2006-0060629 A, published Jun. 5, 2006, 1 page, from http://worldwide.espacenet.com.

English Abstract for Korean Patent Pub. No. 10-2011-0074059 A, published Jun. 30, 2011, 1 page, from http://worldwide.espacenet.com.

* cited by examiner

US 8,434,097 B2

DYNAMIC DATA BINDING FOR MBOS FOR CONTAINER BASED APPLICATION

BACKGROUND

1. Field of the Invention

The present invention relates to mobile applications, and more particularly to dynamic data binding of mobile business objects for mobile applications.

2. Background Art

With the development and popularity of powerful mobile devices, there has been an increased interest in developing mobile applications that allow for the dynamic presentation and modification of data structures stored in remote data stores. Because of data access, coding and deployment challenges, it is difficult to quickly develop applications that dynamically bind data from remote data stores on mobile devices.

Therefore, systems, methods and computer program products are needed that overcome the limitations of conventional mobile applications development for the dynamic binding of data from data structures stored in remote data stores.

BRIEF SUMMARY

Embodiments described herein include a method of dynamically binding data from a remote data store to a mobile application executed on a mobile device. The method begins by defining a metadata source that references both a mobile business object (MBO) and the mobile application, the MBO being connected to the remote data store. An attribute from the MBO is then bound to the mobile application using the metadata source. The method completes by dynamically changing the binding of the bound attribute while the application is executing.

Another embodiment includes a system to allow a mobile application to subscribe to a mobile business object. The system includes a data source stored on a first computer server. An abstraction layer for accessing data in the remote data source that is operatively connected to a first component of the mobile application, the first component being configured to be executed on a second computer server and also configured to receive information from the abstraction layer. A second component, operated on a mobile device, is operatively connected to a first component of the mobile application. A metadata source is configured to contain subscription criteria, the subscription criteria determining the data transferred from the first component to the second component.

Further embodiments, features, and advantages of the invention, as well as the structure and operation of the various embodiments of the invention are, described in detail below with reference to accompanying drawings.

BRIEF DESCRIPTION OF THE FIGURES

Embodiments of the invention are described with reference to the accompanying drawings. In the drawings, like reference numbers generally indicate identical, functionally similar, and/or structurally similar elements. Generally, the drawing in which an element first appears is indicated by the leftmost digit(s) in the corresponding reference number.

The features and advantages of the present invention will become more apparent from the detailed description set forth below when taken in conjunction with the drawings.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible and intended, and fall within the scope and spirit of the present invention.

Overview

Embodiments of the invention provide a design mechanism that allows application developers to quickly and effectively design and develop mobile applications that dynamically bind data at run-time from a data source without compromising functionality, and while reducing the amount of effort required. The dynamic binding methodology used by embodiments described herein allows developers to change the binding of data sources to applications without interrupting or stopping the execution of applications on mobile devices.

Network Architecture

Figure 1:
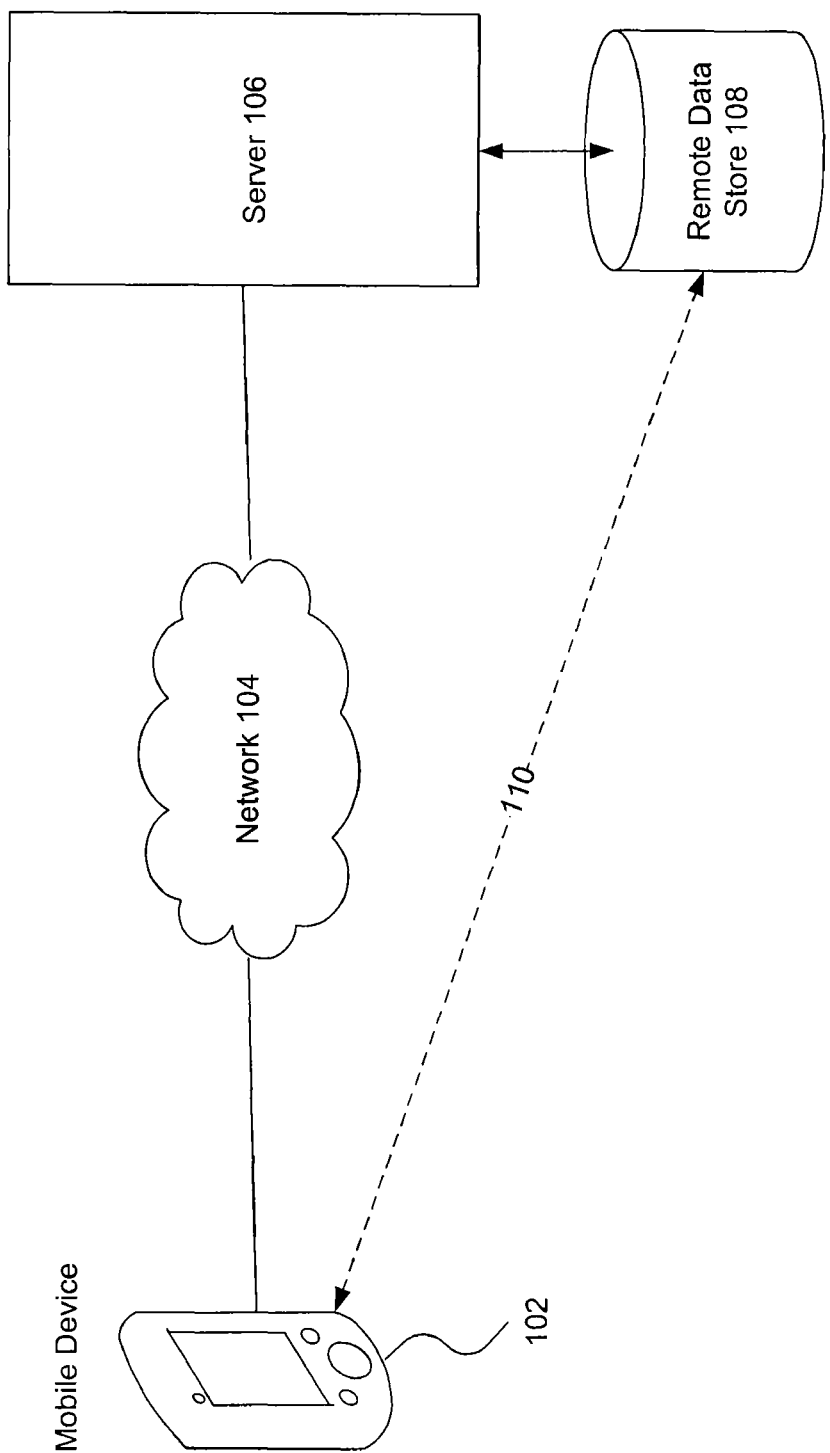
FIG. 1 depicts a network architecture according to an embodiment of the invention.

FIG. 1 is an example network architecture 100 in which embodiments of the present invention, or portions thereof, are implemented. Network architecture 100 includes a mobile device 102 connected over a network 104 to a server 106, in accordance with an embodiment of the present invention. Server 106, in embodiments, is connected to a remote data store 108. Dotted line 190 represents the flow of data between mobile device 102 and remote data store 108, although such data flow is typically via server 106 and network 104.

In an embodiment, mobile device 102 includes one of many devices commonly designated as mobile clients, such as, but not limited to, personal digital assistants ("PDAs"), devices operating according to the Microsoft Pocket PC specification with the Microsoft Windows® CE operating system (OS), devices running the Symbian OS, devices running the Palm OS®, mobile phones, BlackBerry® devices, smart phones, hand held computers, palmtop computers, laptop computers, ultra-mobile PCs, and other wireless mobile devices capable of running mobile applications. In an embodiment, mobile device 102 may be 'online' or connected to server 106. In another embodiment, mobile device 102 can be 'offline' or not connected to server 106. In yet another embodiment, mobile device 102 can be intermittently connected to server 106.

In an embodiment, mobile device 102 includes, but is not limited to, a device having one or more processors and memory for executing and storing instructions. The mobile device 102 may include software, firmware, and hardware or some combination thereof. The software may include one or more applications and an operating system. The hardware can include, but is not limited to, one or more processors, memory and user interface display. In an embodiment, mobile device 102 includes a client application that receives and displays data retrieved from remote data store 108 by server 106.

Although FIG. 1 illustrates a single mobile device 102 for clarity, it is to be appreciated that architecture 100 is scalable and a plurality of mobile device 102 can connect to server 106 via network 104. In an embodiment, network 104 includes one or more networks, including but not limited to, a local area network, medium-area network, and/or wide-area network, such as, the Internet. Network 104, for example, can be a wired or wireless network or combinations thereof that allow mobile device 102, server 106, and remote data source 108 to communicate with each other. In embodiments, network 104 can further support world-wide web protocols and services.

Embodiments of a mobile application development framework and mobile business objects (MBOs) are described in detail below, with continuing reference to FIG. 1.

Mobile Application Development Framework

Figure 2:
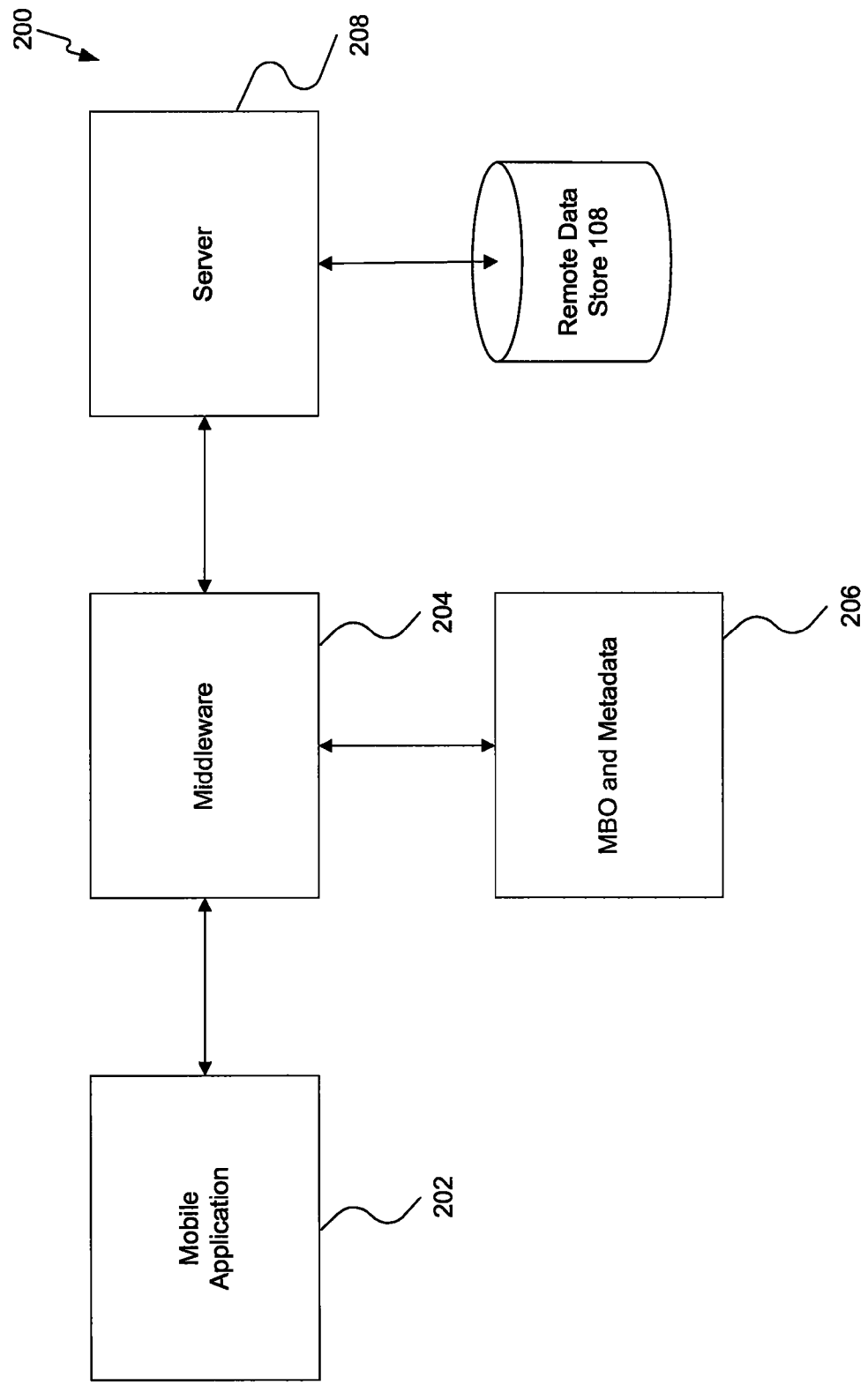
FIG. 2 depicts a mobile application development framework according to an embodiment of the invention.

FIG. 2 is an example mobile application development framework 200, in accordance with an embodiment of the present invention. Framework 200 defines a mobile application 202, middleware 204, an MBO 206 and server 208 accessing remote data store 108, in accordance with an embodiment of the present invention. One skilled in the relevant arts will appreciate that the arrangement shown in framework 200 of FIG. 2 is presented by way of example, and not limitation. In accordance with a further embodiment of the present invention, server 208 is equivalent to server 106 of FIG. 1.

An application is any software program or web service that can be executed or run on a server 106 or mobile device 102. An application may include at least a rendering component, execution logic, and Input/Output (I/O) parameters. An application's execution logic may be in the form of binary executable code or scripting programming/markup languages such as HyperText Markup Language (HTML), Extensible HTML (XHTML), Java, JavaScript, or AJAX (Asynchronous JavaScript and XML). One of skill in the relevant arts will appreciate that other programming languages and technologies can be used for an application's execution logic. In accordance with an embodiment, mobile application 202 is an application configured to operate on mobile device 102 of FIG. 1.

Mobile application 202 accesses data in server 208 by making calls to an API or other interface of middleware 204, in accordance with an embodiment of the present invention. In an embodiment of the present invention, not intended to limit the invention, middleware 204 is the IANYWHERE MOBILINK middleware provided by Sybase, Inc. of Dublin, Calif. One skilled in the relevant arts will appreciate that server 208 may access any number of types of remote data store 108, including, for example, a relational database or a remote procedure. Middleware 204 facilitates communications, through the use of its API, by an application to one or more data sources, such as server 208.

In embodiments, mobile business object (MBO) 206 is an abstraction layer configured for, and connected to, remote data store 108. As used herein, an "attribute" of an MBO includes a broad range of MBO characteristics/operations, including attributes, data, parameters, functions, and other similar items known in the art. Mobile business object (MBO) 206 represents a subset of data contained in remote data store 108, in accordance with an embodiment of the present invention. In accordance with a further embodiment of the present invention, MBO 206 represents multiple data sources simultaneously, e.g., in an embodiment, MBO 206 comprises subsets of multiple data sources. MBO 206 is expressed using metadata, which is interpreted by the software of mobile application 202 to facilitate access of data from server 208 through middleware 204. Example MBOs are described in U.S. patent application Ser. No. 12/503,573, filed on Jul. 15, 2009, Atty. Dkt. No. 1933.0720001, entitled "Metadata Driven Mobile Business Objects," which is incorporated by reference herein in its entirety, although the invention is not limited to this example.

In an embodiment, one type of mobile application 202 that operates within framework 200 is a container-based remote application. In an embodiment of framework 200, the "container" may be termed a framework container, runtime container, mobile runtime container and other similar terms.

Container-Based Remote Applications

Figure 3:
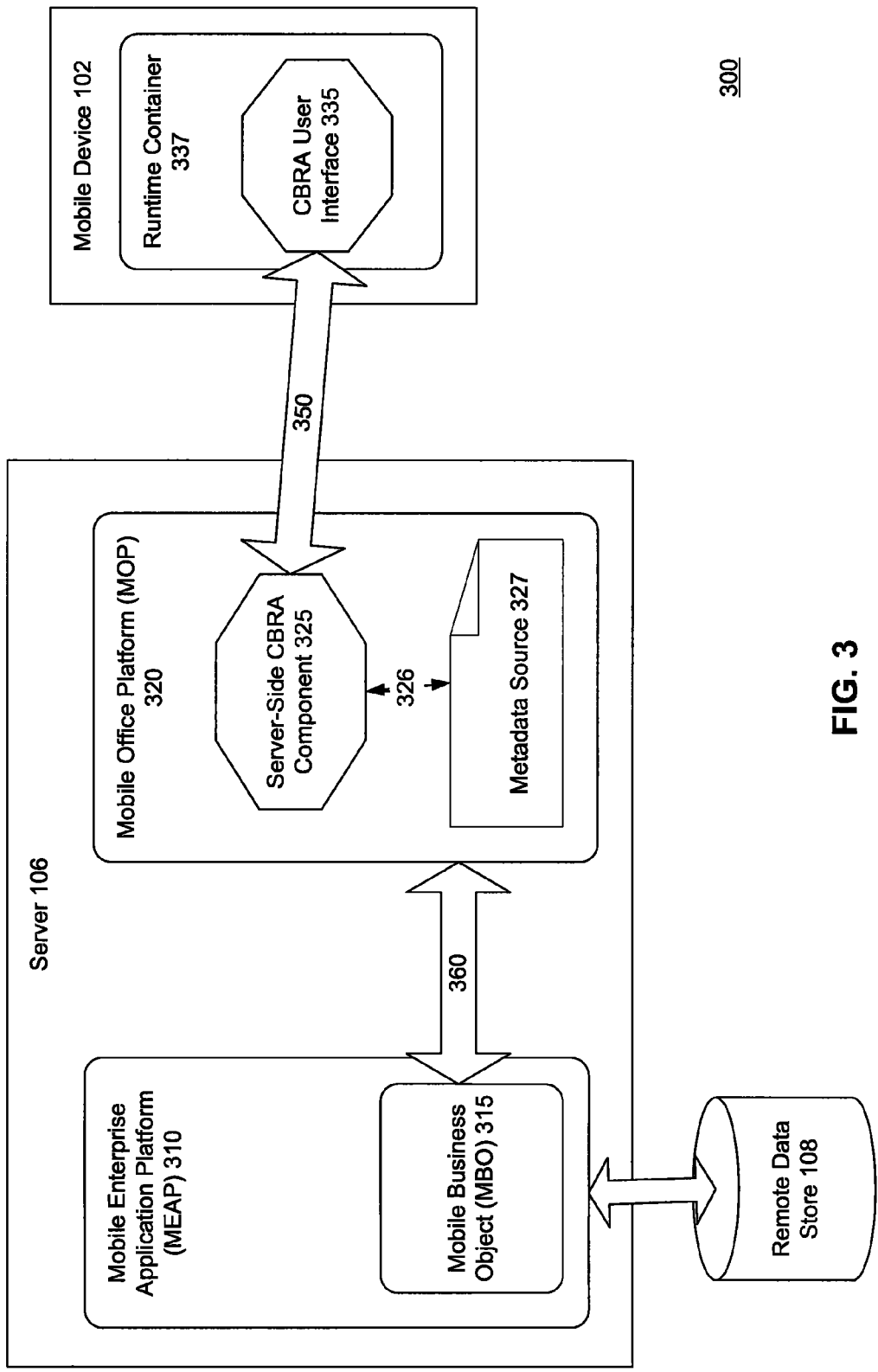
FIG. 3 depicts a container-based remote application according to an embodiment of the invention.

FIG. 3 is a more detailed diagram of FIG. 2, depicting an embodiment where framework 200 provides seamless MBO data integration with mobile device 102 via use of a container-based remote application (CBRA). In embodiments, one type of container-based remote application is called a WORKFLOW available from Sybase, Inc. of Dublin, Calif. In accordance with an embodiment, widgets are objects or applets on a computer display with which a user may interact. As used herein, the terms CBRA, CBRA application, WORKFLOW, widget, widget object and container-based application will be used interchangeably.

According to an embodiment, CBRA framework 300 is a container framework within which a mobile device CBRA may be deployed and executed. In embodiments, CBRA framework 300 has a server-side CBRA component 325 deployed on server 106 in, for example, a mobile office platform (MOP) 320. An example of a MOP 320, not intended to limit the invention, is SYBASE IANYWHERE MOBILE OFFICE (iMO) platform, available from Sybase, Inc. of Dublin, Calif.

Embodiments of CBRA framework 300 also have a client-side CBRA user interface 335 component deployed on mobile device 102. In an embodiment, FIG. 3 depicts CBRA user interface 335 as being enabled in a framework executed within a runtime container 337.

In an embodiment shown in FIG. 3, remote data store 108 is integrated via mobile business object 315 hosted within a mobile enterprise application platform (MEAP) 310. As known by those skilled in the art, MEAPs 310 provide client/server middleware for enabling mobile applications. An example of a MEAP 310, not intended to limit the invention, is the SYBASE UNWIRED PLATFORM (SUP), available from Sybase, Inc. of Dublin, Calif.

In embodiments, server-side CBRA component 325 is linked to MBO 315 through MEAP 310. According to embodiments, each deployed server-side CBRA component 325 has an associated metadata source 327. As is discussed in the Dynamic Data Binding and Subscriptions at Run-Time section below, in embodiments, this metadata source 327 provides information that defines data transfer among the remote data store 108, MBO 315, server-side CBRA component 325 and CBRA user interface 335 components.

It should be recognized that, despite the depictions of MEAP 310 and MOP 320 as being deployed on a single server 106, in different embodiments, the actual deployment of these modules may be on multiple servers.

Business Process CBRA

One type of CBRA that can be deployed in embodiments of the framework shown in FIG. 3 is a business process CBRA. As would be apparent to persons skilled in the relevant art, a business process is any collection of interrelated tasks which solve a particular problem or issue for an organization or enterprise. A business process may be a series of steps designed to produce a result. Business processes may result in outputs or services that are received by users outside the organization. Other processes produce outputs that are not visible outside of the organization. Business processes can govern the operation of a system such as operational business processes that perform purchasing, manufacturing, marketing, and sales tasks in an organization. Supporting business processes such as accounting, benefits, information technology (IT), and human resources/recruiting, support an organization's core processes. A business process can be decomposed into several sub-processes, wherein the respective sub-processes have their own attributes, and wherein the sub-processes contribute to performing the overall task of the business process. Complex business processes link multiple organizations or enterprises through business process management and activity monitoring tools.

In accordance with embodiments described herein, business process widgets are abstractions of business processes or sub-processes. In an embodiment, business process widgets are customized to suit typical applications that can be deployed to mobile device 102. In some embodiments, business process widgets are configured using Extensible Markup Language (XML) to describe a business process event and a UI layout. In another example, business process widgets may include Extensible Application Markup Language (XAML) script or code. Business process widgets can be self contained or can interact with native applications resident on a mobile device, such as mobile device 102, or on a server, such as server 106. For example, a CBRA may be a data object on a mobile device display screen with which users of mobile device 102 interact. An example of an XML CBRA that supports business processes is the IANYWHERE MOBILE OFFICE XML WORKFLOW, available from Sybase, Inc. of Dublin, Calif.

Examples of business process and application widgets include purchase order approval, human resources approval processes, expense report approval process, sales and marketing processes, CRM activities notification, and Really Simple Syndication (RSS) format Internet feed notifications. Example business process widgets are described in U.S. patent application Ser. No. 12/104,905, filed on Apr. 17, 2008, entitled "Synchronizing Communications and Data Between Mobile Devices and Servers," which is incorporated by reference herein in its entirety. As would be apparent to persons skilled in the relevant art given the descriptions herein, other types of widgets are supported by embodiments described herein. In particular, the invention is not limited to business processes.

Mapping with Metadata Source 327

Figure 5:
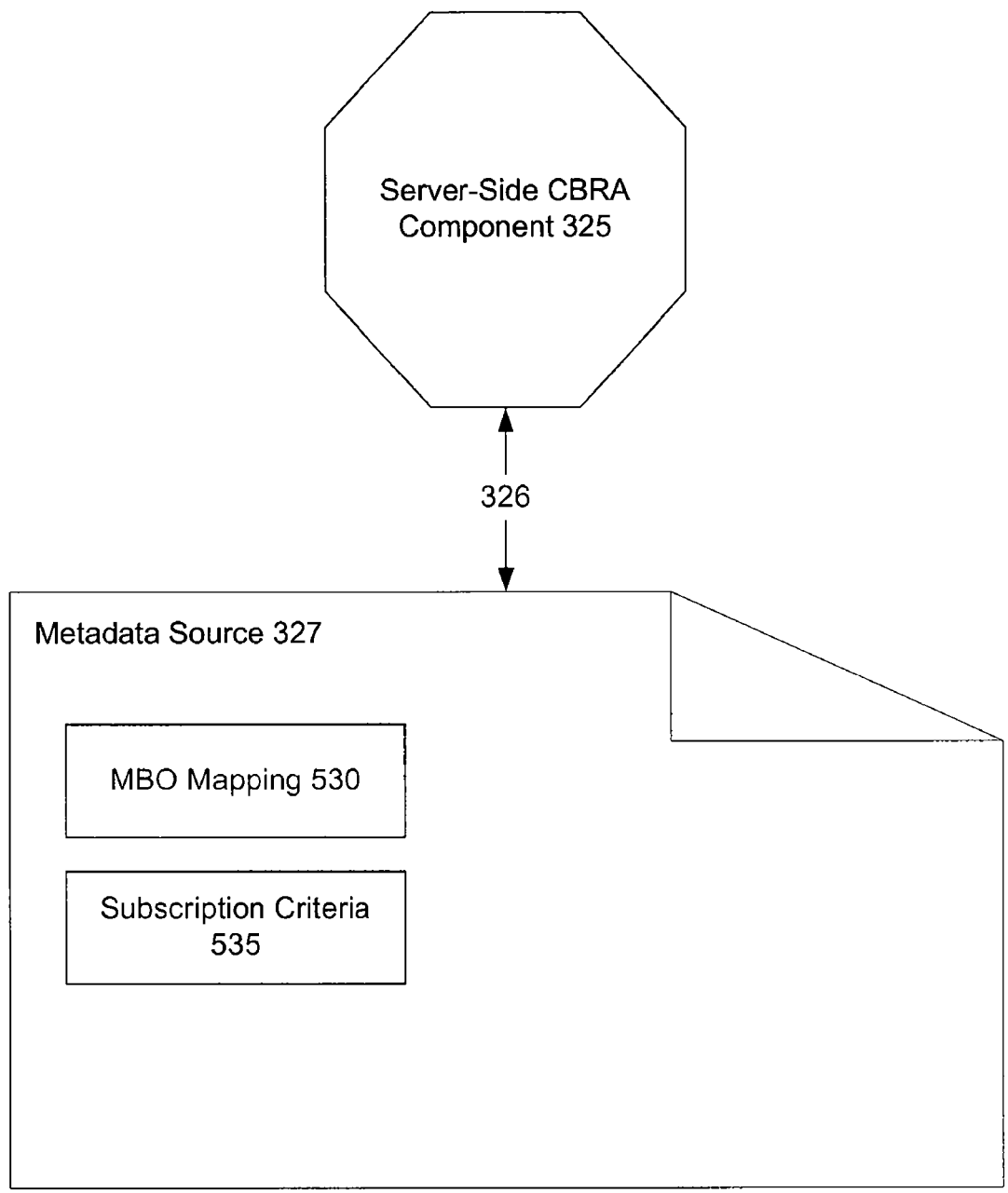
FIG. 5 depicts a metadata source according to an embodiment of the invention.

FIG. 5 depicts a connection 326 between server-side CBRA component 325 and metadata source 327. As shown in FIG. 5, metadata source 327, in embodiments, contains MBO mapping 530 and subscription criteria 535. The list of included items is not intended to limit the scope of the invention. In embodiments, metadata source 327 can be any source of data, readable by server-side CBRA component 325, e.g., a file, a registry, a database. An example of a metadata source 327 is the "templateClient.xml" file, used by the IANYWHERE MOBILE OFFICE discussed above with FIG. 3. Metadata source 327 is depicted on MOP 320, but it need not be installed with the MOP 320, or even installed on the same server 106.

Turning to FIGS. 6A-D, embodiments of the present invention enable the dynamic binding of a user interface control 610 in CBRA user interface 335 to remote data store 108 data via MBO 315. FIGS. 6A-D depict example embodiments, not intended to limit the scope of the invention, showing different data components bound together or mapped according to metadata source 327.

Each column on FIGS. 6A-D shows components in an embodiment of CBRA framework 300, with connections (on FIG. 6A for example, 635, 645, 655, 615) showing the data flow between components. The columns are grouped as either CBRA application data source 671 or CBRA application 672. Row 601 suggests example platform or application components, row 602 shows the placement of data containers and their linkages, row 603 suggests example platform types or operating environments and row 604 suggest sample hardware to perform the functions shown.

Figure 6A:
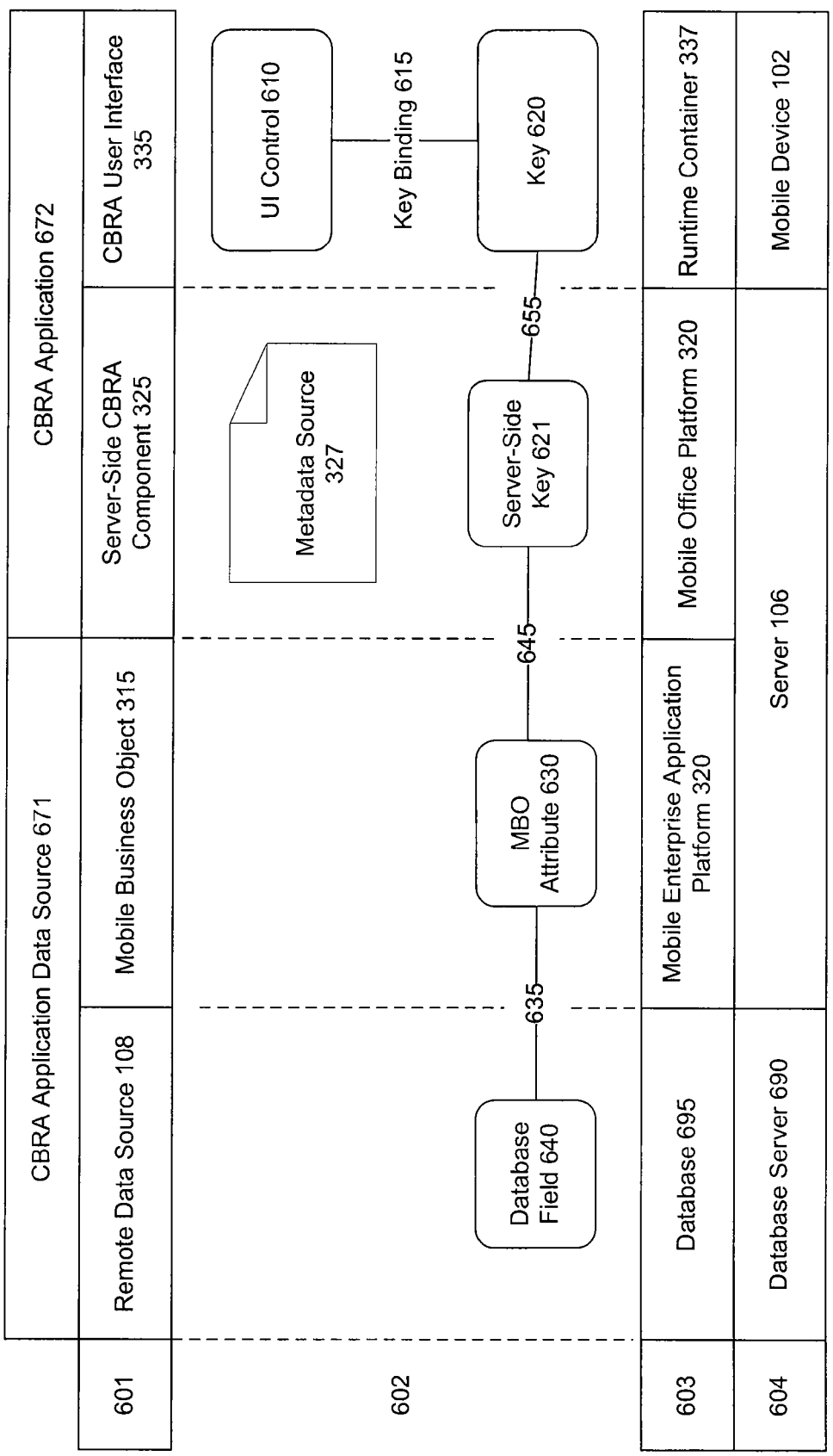
FIGS. 6A-D are diagrams showing data flow among components according to an embodiment of the invention.

Looking at FIG. 6A, CBRA user interface 335 has UI control 610 to display and capture data in mobile application 202. As represented by key binding 615, in an embodiment, at the time CBRA user interface 335 is designed, UI control 610 is defined and bound to a key 620. Key 620 is part of CBRA UI 335, and provides logical handles for linking input and output data associated with CBRA UI 335. Server-side key 621 is a storage container for data in the server-side CBRA component 325. In embodiments, MBO attribute 630 and key 620 may be directly connected without server-side key 621. In other embodiments, server-side key 621 may act as another container, with its own mapping name, different from client-side key 620.

The base data source for the sample application depicted in FIGS. 6A-D is database 695 running on database server 690. Database field 640 is a container that contains a piece of data, and this container is linked to MBO attribute 630. Embodiments of MBO attribute 630 may store copies of database field 640 data, and MBO 315 logic can periodically retrieve updated values via connection 635.

By linking server-side CBRA component 325 to MBO 315, connection 645 establishes a linkage between CBRA application 672 and CBRA application data source 671. In embodiments described herein, this connection 645 is initially defined in metadata source 327 at design time. As discussed below, with respect to connection 645, different situations may require the addition, removal or modification of connections at run-time, and modification of MBO mapping 530 in metadata source 327 enables these run-time actions.

Connection 655 shows the linkage between the server-side CBRA component 325 and the CBRA user interface 335. In embodiments, connection 655 is performed using network 104. In embodiments, MBO mapping 530 in metadata source 327 also defines the connection 655 linkage, specifying the specific key 620.

An embodiment depicted on FIG. 6A represents an initial deployment: mapping UI control 610 to database field 640 via key 620, server-side key 621 and MBO attribute 630. For example, the following logical names may be used by different components for the same value:

M1. Database field 640 is "FirstName,"
M2. MBO attribute 630 is "FName," and
M3. Key 620 is "First."

In the above example, data in MBO mapping 530 maps examples M1-M3 to each other, determining how the value is passed between components in row 602. Additional uses for the MBO mapping 530 would be apparent to one skilled in the art given this description.

Figure 6B:
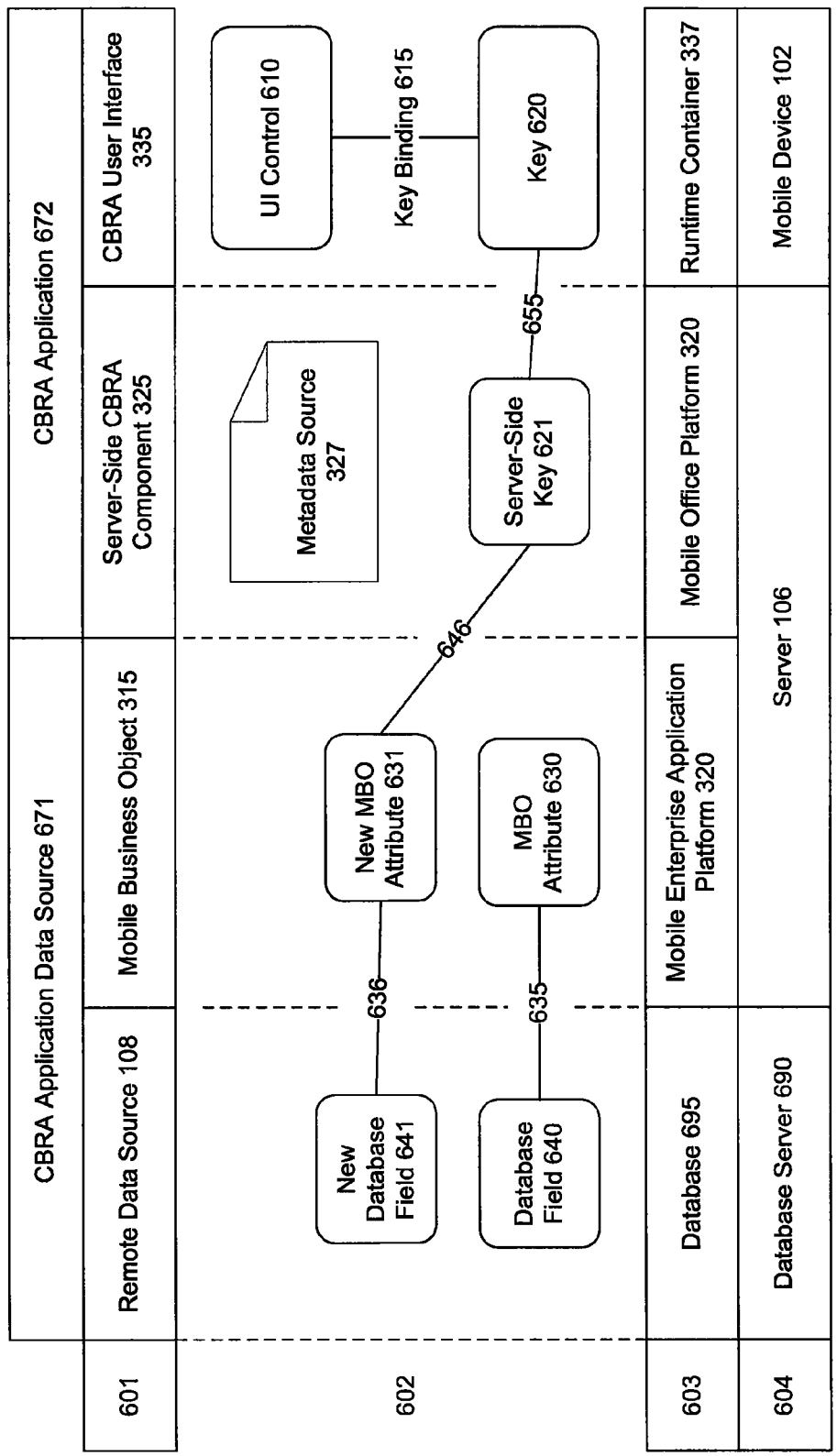

The FIG. 6B embodiment represents an example situation where a new database field 641 is added to database 695. In this example, at run-time, it is desired that this new field replace the display of database field 640 in UI control 610. To bring this database field 641 into CBRA application 672, first, a new MBO attribute 631 is added and linked by connection 636 to new field 641. To complete the replacement of database field 640 with database field 641, MBO mapping 530 in metadata source 327 is changed during run-time from connection 645 to 646. This change of metadata source 327 accomplishes a dynamic data binding in this container-based CBRA application 672.

Another example situation (not shown) where dynamic MBO mapping 530 could be dynamically changed to adapt CBRA application 672 to changes in remote data store 108, involves the renaming of MBO attribute 630. Different situations may require that, for example, the MBO attribute "FName" be changed to "First_Name." In embodiments of the present invention, a dynamic change to the binding name can be made by modifying MBO mapping 530 in metadata source 327. It would be apparent to one of skill in the art that, new or changed MBO attributes 630 could be created for many different application development reasons, and embodiments described herein could be dynamically adapted at run-time. Different embodiments may use this remapping capability for the normal operation of an application, and not just for the redesign of an existing one.

Figure 6C:
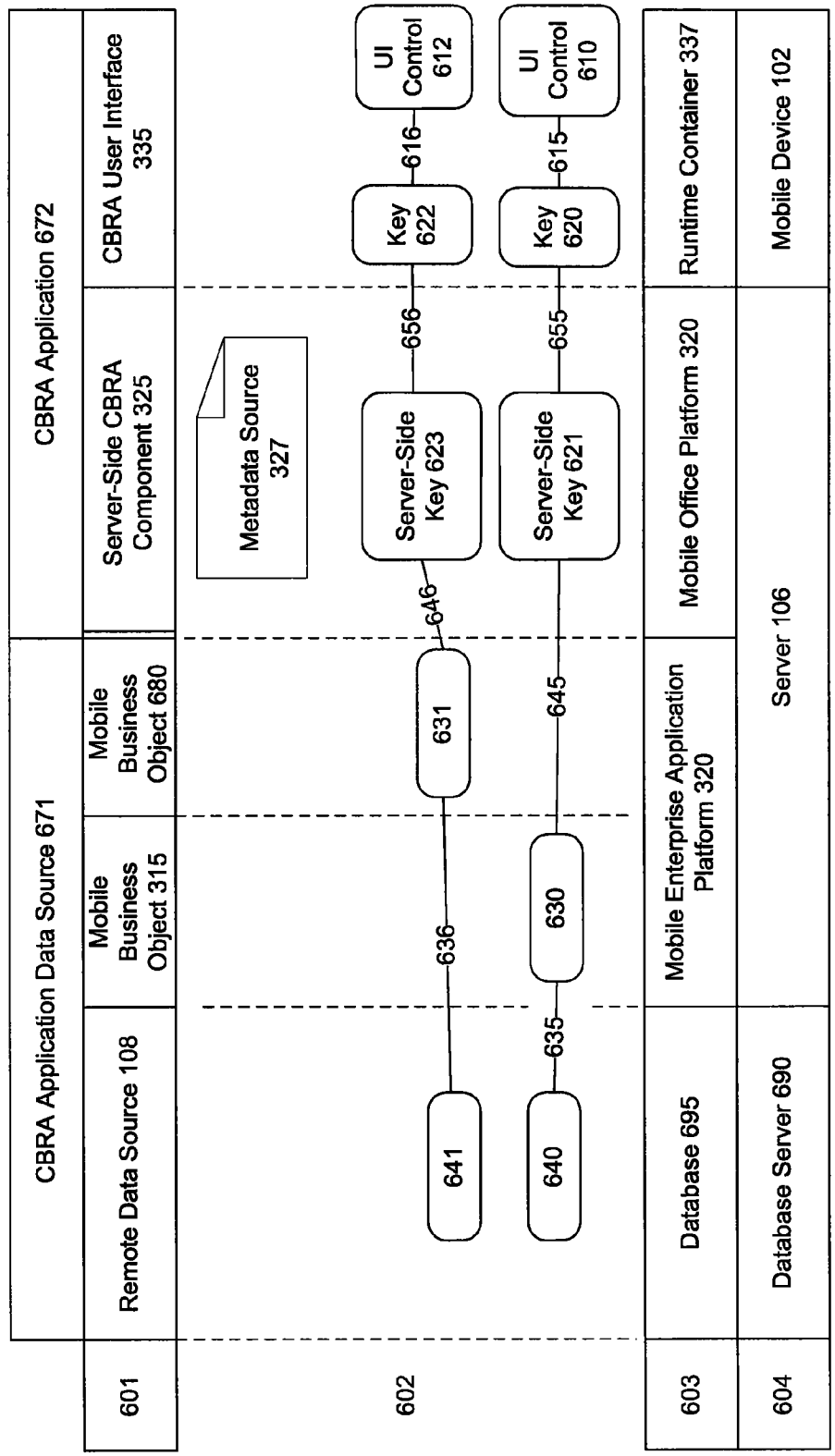

FIG. 6C displays an additional example where, at design time, an additional UI control 612 with an associated key 622 is added to CBRA user interface 335 in CBRA application 672. To support this new UI control 612, in this example, a new MBO 680 is added. MBO attribute 631 in MBO 680 is mapped to database field 641 via connection 636. To link the CBRA application data source 671 with CBRA application 672, MBO mapping 530 in metadata source 327 specifies that server-side key 623 is mapped, via connection 646, to MBO attribute 631. This example illustrates the use of metadata source 327 to map data sources across MBOs.

Subscription Criteria with Metadata 327

Figure 6D:
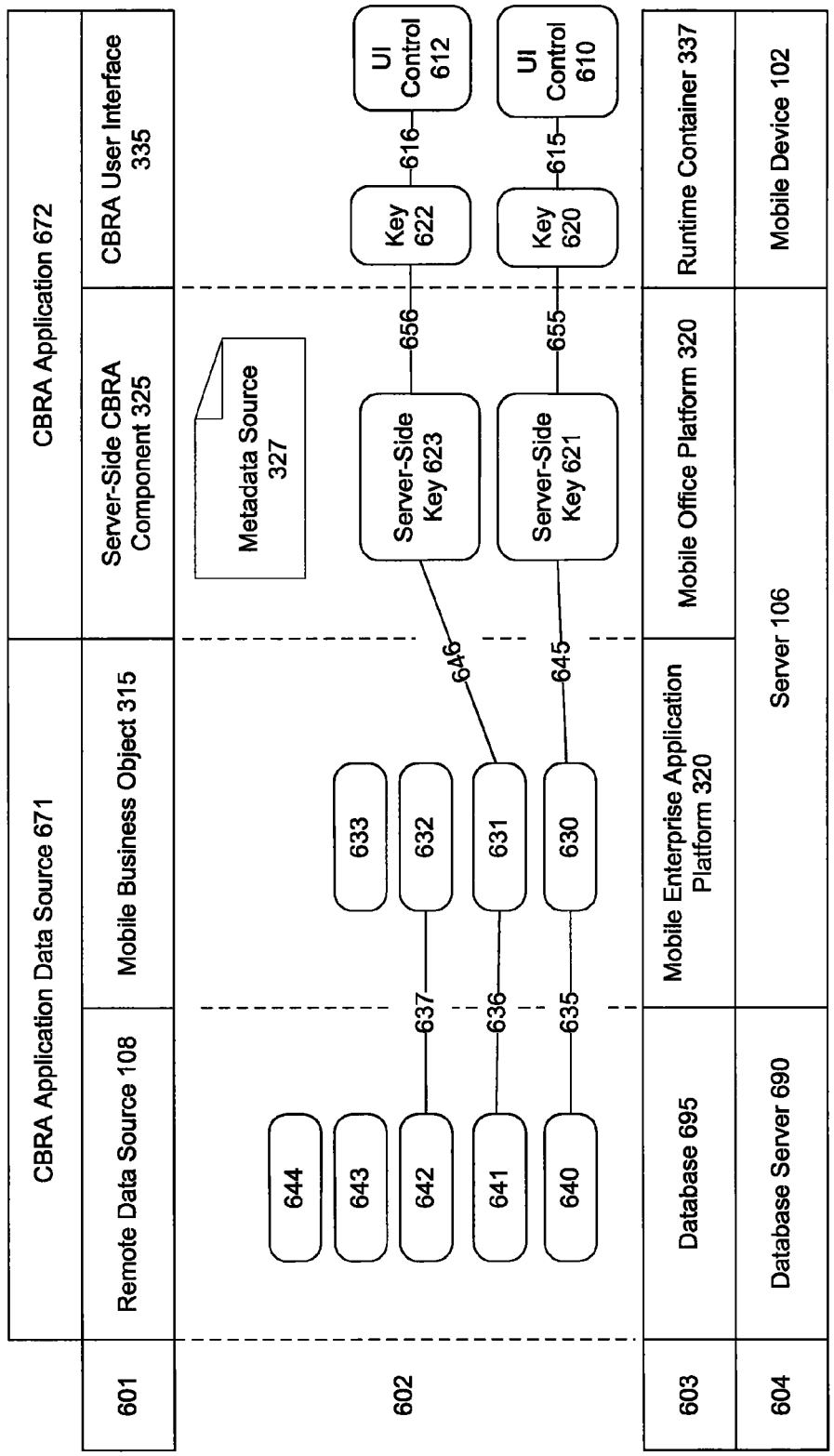

In addition to the mapping function described above, embodiments of the present invention enable the selection and routing of data between CBRA application 672 and CBRA application data source 671 based on subscription criteria 535 stored in metadata source 327. FIG. 6D illustrates examples of this selection and routing function.

FIG. 6D shows, in an example not intended to limit the invention, CBRA application 672 with a CBRA user interface 335 having two UI controls 610 and 612. CBRA application 672 is supported by CBRA application data source 671 using database 695. Database 695 has five database fields 640-644. MBO 315 is the abstraction layer for the CBRA application 672, having four MBO attributes 630-633 for linking to any compatible remote data source 108 available. Three of the MBO attributes 630-632 are linked to database fields 640-642 respectively, via connections 635-637.

The linkage between CBRA application 672 and CBRA application data source 671 in this example, is effected by connections 645 and 646, the connections linking MBO attributes 630 and 631 to server-side keys 621 and 623 respectively.

In an embodiment, the server-side CBRA component 325 can use subscription criteria 535 to specify to MBO 315 which mapped data should be retrieved by MBO 315 from database 695. More particularly, subscription criteria 535, stored in metadata source 327 when CBRA application 672 is deployed to MOP 320, can be used by embodiments to specify to connected MBO 315 which of the connected field 640-642 data to retrieve, and at what interval. For example, in this embodiment, MBO attribute 632, though linked to database field 642 and available to CBRA user interface 335, is not included in subscription criteria 535 and is thus not updated from database field 642.

Another example of the use by embodiments of subscription criteria 535 involves connections 645 and 646 between MBO attributes 630, 631 on MBO 315 and server-side keys 621, 623 on server-side CBRA component 325 respectively. As discussed above, MBO 315 and server-side CBRA component 325 may not be operating on the same physical server 106. In embodiments, though MBO 315 may have updated the values MBO attributes 630, 631, because of different considerations, e.g., the bandwidth between separate servers and the requirements of CBRA application 672, server-side key 623 may not need to be updated as frequently as server-side key 621. Subscription criteria 535 can specify this update differential, dictating whether and when each server-side key 621, 623 is updated.

Another example of the use by embodiments of subscription criteria 535 involves connections 655 and 656 between server-side keys 621, 623 and keys 620, 622 respectively. As discussed with respect to connections 645, 646 above, keys 620, 622 may not need to be updated at the same interval. In embodiments, the considerations for management of the connection 655, 656 data transfer are significant because connections 656, 656 are performed via potentially lower bandwidth network 104. In embodiments, subscription criteria 535 can specify whether and when each key 620, 622 is updated.

Dynamic Binding and Subscriptions at Run-Time

Embodiments described herein enable the bindings and subscription criteria discussed above and as embodied in metadata source 327, to be dynamically changed at run-time. According to embodiments, no restart of the system, or new coding is required to modify and implement the changes in, the mapping or the subscription criteria specified by metadata source 327.

Figure 7:
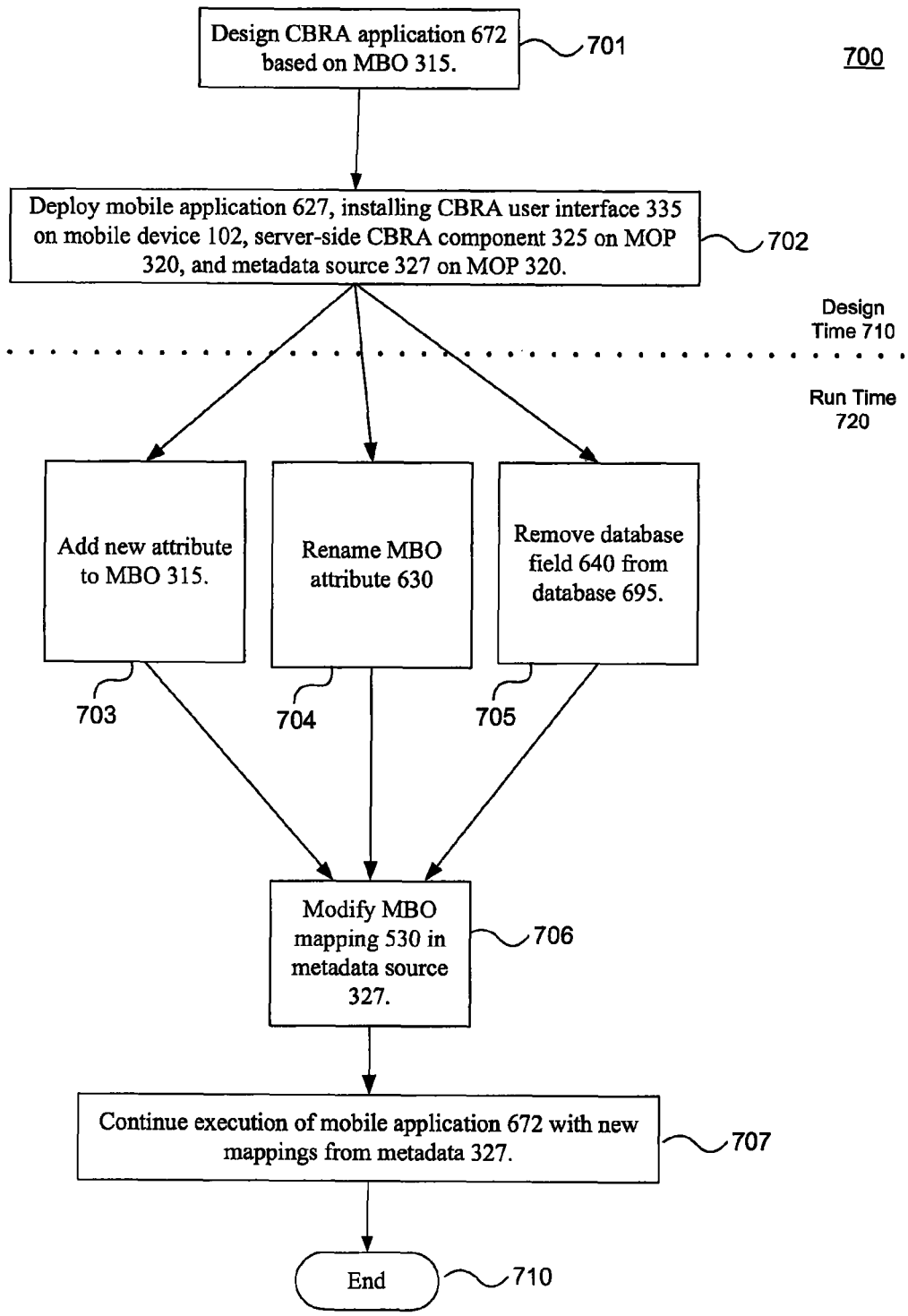
FIG. 7 illustrates examples of dynamic binding according to an embodiment of the invention.

Flowchart 700, shown at FIG. 7, illustrates the steps of different examples of dynamic binding of UI control 610. In step 701, a mobile application, for example CBRA application 672 from FIG. 6D, is designed at design time 710, having as its data source as MBO 315.

In step 702, at design time 710, the components of CBRA application 672 are deployed to both MOP 320 and runtime container 337. The deployed application, for example, includes server-side keys 621, 623, key 620, 622, UI controls 610, 612 and metadata source 327. In another embodiment, keys 620, 622 and UI controls 610, 612 are only deployed at the time a user on mobile device 102 requests the execution of CBRA application 672. In metadata source 327, MBO mapping 530 maps server-side key 621 to MBO attribute 630 via connection 645, and MBO attribute 630 to database field 640 via connection 635.

In an embodiment, transitioning to run-time 720 is accomplished by enabling the execution of CBRA application 672 by allowing users to access CBRA user interface 335.

In example 703, a new MBO attribute 632 is added to MBO 315, and a requirement is specified to link this new MBO attribute 632 to UI control 610, instead of MBO attribute 630. At step 706, this linking is effected by modifying MBO mapping 530 in metadata source 327. At step 707, the run-time execution of CBRA application 672 continues with the new mapping, and with the new attribute available to CBRA application 672.

In example 704, the logical name of MBO attribute 630 is changed from "F_Name" to "FirstName." Often, MBOs are shared by multiple applications, and changes to logical names may be required. In an embodiment of MBO 315, changing this logical name disables connection 645 between MBO attribute 630 and server-side key 621. In step 706, MBO mapping 530 can be changed to link server-side key 621 to the new logical name of MBO attribute 630 and the linkage is not interrupted. At step 707, the run-time execution of CBRA application 672 continues with the new mapped logical name.

In example 705, database field 640 is removed from database 695. Often, databases are shared by multiple applications, and modification of the data structures may by required. As shown on FIG. 6D, and described above, database field 640 is linked to server-side key 621 via MBO attribute 630. Removing this field 640 would affect UI control 610. To address this change to remote data source 108, at step 706, MBO mapping 530 in metadata source 327 can be changed to remap server-side key 621 to a new data source, e.g., MBO attribute 632. In an embodiment, server-side key 621 could also be mapped to other available data resources, e.g., different MBOs, to supply the missing database field 640 data. At step 707, the run-time execution of CBRA application 672 continues with the new MBO attribute mapping.

Method 400

Figure 4:
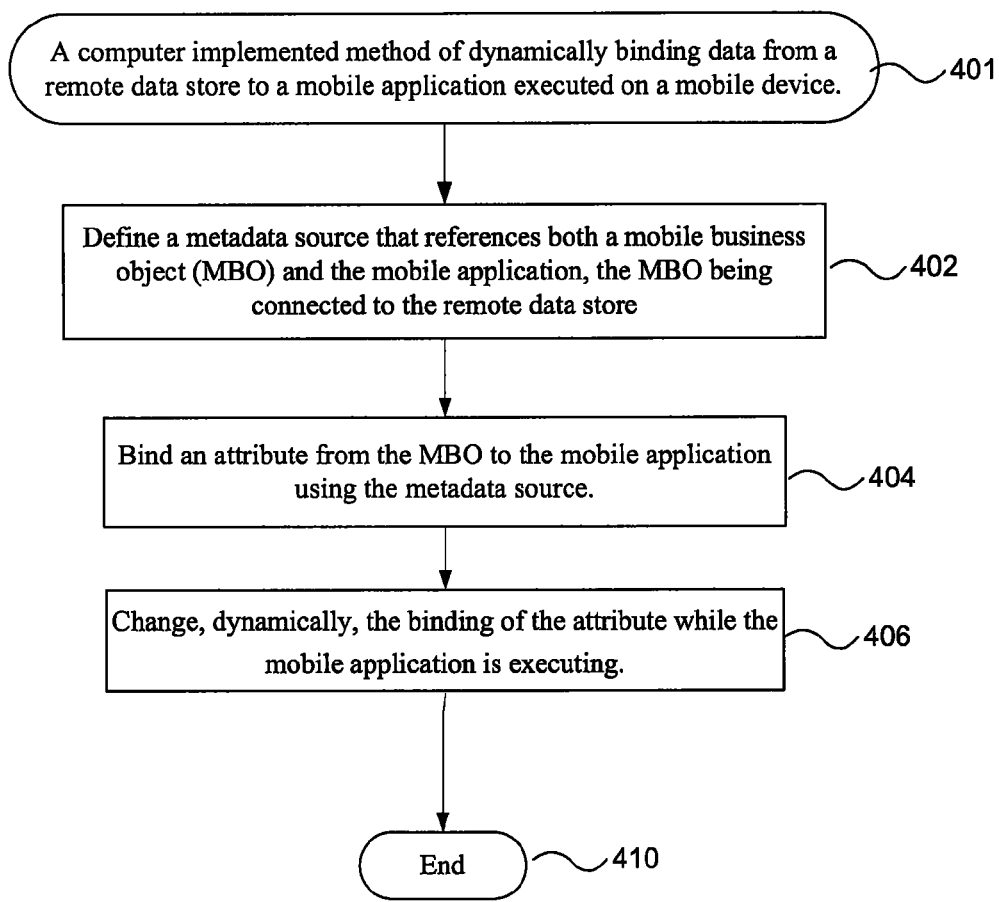
FIG. 4 is a flowchart illustrating the operation of a dynamic data binding function according to an embodiment of the invention.

This section summarizes the techniques outlined herein by presenting a computer-implemented method of dynamically binding data from a remote data store in a mobile application executed on a mobile device. FIG. 4 is a flowchart of an exemplary method 400 for dynamically binding data from a remote data store in a mobile application executed on a mobile device. While method 400 is described with respect to an embodiment of the present invention, method 400 is not meant to be limiting and may be used in other applications.

As shown in FIG. 4, an embodiment of method 400 begins at step 402 where a metadata source is defined that references both a mobile business object (MBO) and a mobile application. The MBO is connected to the remote data store. In an embodiment, a metadata source, such as metadata source 327 may be defined at this step, referencing an MBO, such as MBO 315, the MBO associated with a data store, such as remote data store 108 of FIG. 1. Once step 402 is complete, method 400 proceeds to step 404.

At step 404, an attribute from the MBO is bound to the mobile application using the metadata source. In an embodiment, a metadata source, such as metadata source 327 is user to bind an MBO attribute, such as MBO attribute 630, to a mobile application, such as mobile application 202 of FIG. 2. Once step 404 is complete, method 400 continues to step 406.

At step 406, the binding of the attribute is dynamically changed while the mobile application is executing. In an embodiment, a binding is dynamically changed, such as connection 645 of FIG. 6A. The changed binding is of an MBO attribute, such as MBO attribute 630 of FIG. 6A. Once step 406 is complete, method 400 ends.

Steps 402, 404 and 406 may be implemented as software, hardware, firmware, or any combination thereof.

Example Computer Embodiment

Figure 8:
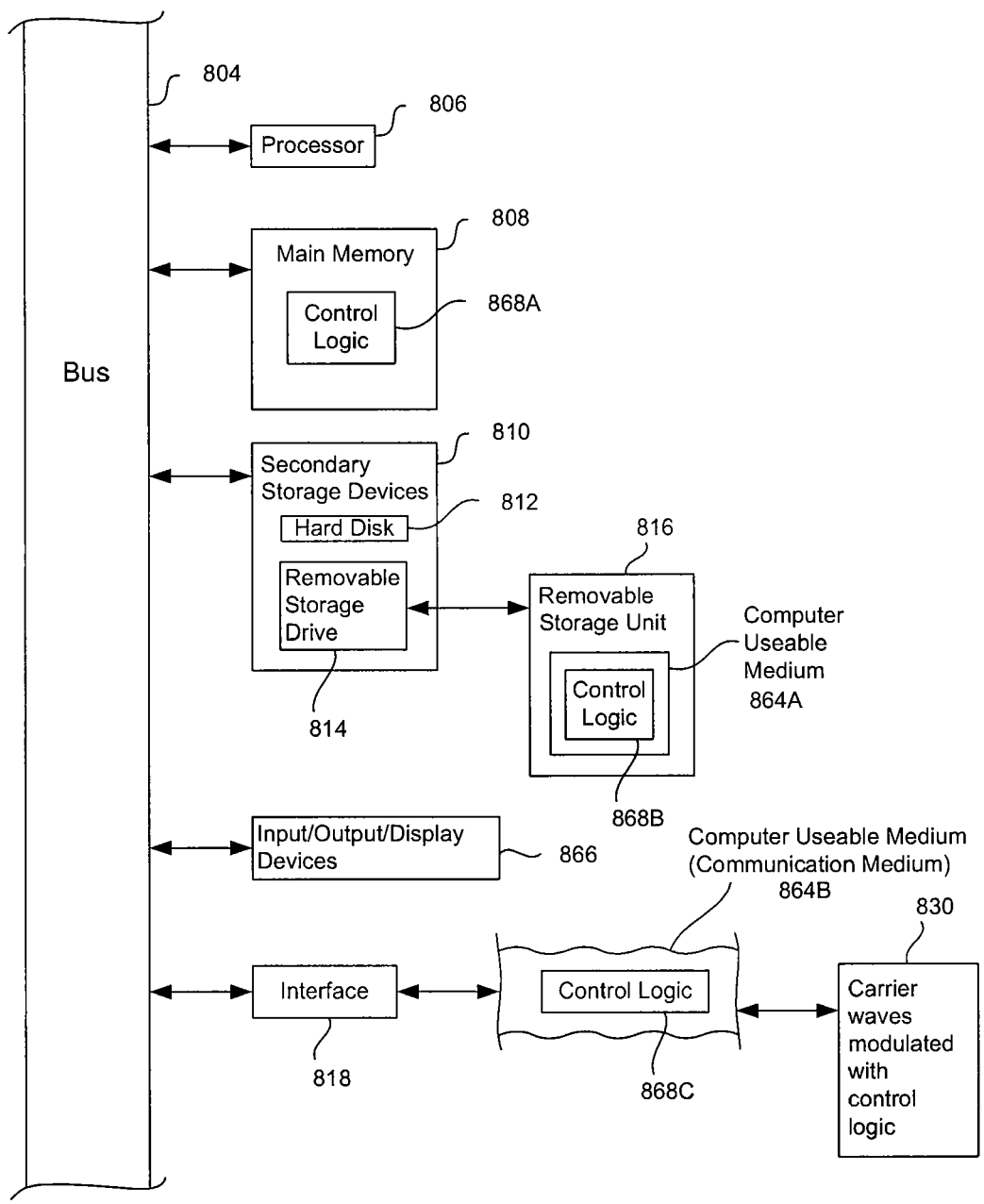
FIG. 8 illustrates an example computer system, useful for implementing components of embodiments of the invention.

In an embodiment of the present invention, the system and components of embodiments described herein are implemented using well known computers, such as computer 802 shown in FIG. 8. For example, mobile device 102, server 208 and the operation of flowcharts in FIGS. 4 and 7 described above, can be implemented using computer(s) 802. Computer 802 includes mobile devices or other mobile processing system components as described in relation to FIG. 1.

Computer 802 can be any commercially available and well known computer capable of performing the functions described herein, such as computers available from International Business Machines, Apple, Sun, HP, Dell, Compaq, Digital, Cray, etc.

The computer 802 includes one or more processors (also called central processing units, or CPUs), such as a processor 806. The processor 806 is connected to a communication bus 804.

The computer 802 also includes a main or primary memory 808, such as random access memory (RAM). The primary memory 808 has stored therein control logic 828A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 822, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from the computer 802 via the communication medium 824B. More particularly, the computer 802 may receive and transmit carrier waves (electromagnetic signals) modulated with control logic 830 via the communication medium 824B.

Any apparatus or manufacture comprising a computer useable or readable medium having control logic (software) stored therein is referred to herein as a computer program product or program storage device. This includes, but is not limited to, the computer 802, the main memory 808, secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

Conclusion

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method of dynamically binding data in a data store to a mobile application executed on a mobile device, comprising:
    defining a metadata source that references both a first mobile business object (MBO) attribute of an MBO and an attribute of the mobile application, wherein the MBO is connected to the data store and the first MBO attribute is linked to a first attribute stored in the data store;
    binding the first MBO attribute to the attribute of the mobile application using the metadata source; and
    changing, dynamically, the binding of the attribute of the mobile application to a second MBO attribute of the MBO while the mobile application is executing, wherein the second MBO attribute is linked to a second attribute stored in the data store.

2. The computer-implemented method of claim 1, wherein the mobile application is a container-based mobile application.

3. The computer-implemented method of claim 1, wherein the metadata source stores binding information in extensible markup language (XML).

4. The computer-implemented method of claim 1, wherein the mobile application is an XML business object executed within an XML business object container.

5. The computer-implemented method of claim 1, further comprising:
    limiting data received by the mobile application from the MBO based on subscription criteria stored in the metadata source.

6. The computer-implemented method of claim 1, wherein binding an attribute comprises:
    linking, in the metadata source, data referenced by the MBO to a user interface control of the mobile application.

7. The computer-implemented method of claim 1, wherein the mobile application comprises both a client side and server-side component, and wherein the metadata source is referenced by the server-side component to set bindings to the MBO.

8. A system of binding data from a data store to a mobile application comprising:
    a first component of the mobile application, the first component configured to be executed on a computer server, wherein the first component is configured to be operatively connected to a second component of the mobile application, the second component being operated on a mobile device, wherein the first and second components reference a mobile application attribute;
    an abstraction layer configured to access data in the data store, the abstraction layer and the first component being operatively connected; and
    a metadata source configured to map data referenced in the abstraction layer to the mobile application, wherein the abstraction layer is further configured to:
        based on the metadata source, map the mobile application attribute to a first attribute stored in the data store, and
        based on a change to the metadata source, change the mapping of the mobile application attribute from the first attribute to a second attribute stored in the data store,
    wherein the changing of the mapping occurs while the mobile application is executing.

9. The system of claim 8, wherein the abstraction layer is a mobile business object.

10. A computer-readable medium having computer-executable instructions stored thereon that, when executed by a computing device, cause the computing device to perform a method of dynamically binding data in a data store to a mobile application executed on a mobile device, the instructions comprising:
    an instruction to define a metadata source that references both a first mobile business object (MBO) attribute of an MBO and an attribute of the mobile application, wherein the MBO is connected to the data store and the first MBO attribute is linked to a first attribute stored in the data store;
    an instruction to bind the first MBO attribute to the attribute of the mobile application using the metadata source; and
    changing, dynamically, the binding of the attribute of the mobile application to a second MBO attribute of the MBO while the mobile application is executing, Wherein the second MBO attribute is linked to a second attribute stored in the data store.

11. The computer-readable medium of claim 10, wherein the instruction to bind an attribute comprises:

an instruction to link, in the metadata source, data referenced by the MBO to a user interface control of the mobile application.

12. The computer-readable medium of claim 10, wherein the mobile application comprises both a client side and server-side component, and wherein the metadata source is referenced by the server-side component to set bindings to the MBO.

13. The computer-readable medium of claim 10, wherein the instructions stored thereon further comprise:
  an instruction to limit data received by the mobile application from the MBO based on subscription criteria stored in the metadata source.

\* \* \* \* \*